(12) United States Patent
Oikawa et al.

(10) Patent No.: US 11,020,887 B2
(45) Date of Patent: Jun. 1, 2021

(54) RESIN MOLDING METHOD

(71) Applicant: CANON KABUSHIKI KAISHA, Tokyo (JP)

(72) Inventors: Satoshi Oikawa, Yokohama (JP); Yukuo Yamaguchi, Tokyo (JP); Mikiya Umeyama, Tokyo (JP); Hiromasa Amma, Kawasaki (JP); Takuya Iwano, Inagi (JP); Satoshi Kimura, Kawasaki (JP); Naoko Tsujiuchi, Kawasaki (JP); Yasushi Iijima, Tokyo (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 15/628,934

(22) Filed: Jun. 21, 2017

(65) Prior Publication Data

US 2017/0368728 A1    Dec. 28, 2017

(30) Foreign Application Priority Data

Jun. 28, 2016    (JP) .............................. JP2016-127560

(51) Int. Cl.
| | |
|---|---|
| *B29C 45/14* | (2006.01) |
| *B29C 45/00* | (2006.01) |
| *B29C 45/16* | (2006.01) |
| *B29C 45/17* | (2006.01) |
| *B29C 65/00* | (2006.01) |

(52) U.S. Cl.
CPC .......... *B29C 45/14* (2013.01); *B29C 45/0062* (2013.01); *B29C 45/16* (2013.01);
(Continued)

(58) Field of Classification Search
CPC . B29C 45/0003; B29C 45/04; B29C 45/0408; B29C 45/0416; B29C 45/13;
(Continued)

(56) References Cited

U.S. PATENT DOCUMENTS

| | | | |
|---|---|---|---|
| 2,739,727 A * | 3/1956 | Fudge ................... | B65D 15/22 220/4.28 |
| 6,428,730 B1 * | 8/2002 | Nishida ................. | B29C 45/006 264/255 |

(Continued)

FOREIGN PATENT DOCUMENTS

| | | | | |
|---|---|---|---|---|
| EP | 1055505 B1 * | 8/2006 | ......... | B29C 45/0062 |
| JP | 06246781 A * | 9/1994 | ......... | B29C 66/1142 |

(Continued)

OTHER PUBLICATIONS

"InkJet Filtration" https://www.membrane-solutions.com/ink-jet.htm accessed Apr. 3, 2019 (Year: 2014).*

(Continued)

*Primary Examiner* — Francisco T Tschen
*Assistant Examiner* — Elisa H Vera
(74) *Attorney, Agent, or Firm* — Venable LLP (57) ABSTRACT

A resin molding method includes a first molding step, a sliding step, a second molding step and a mold opening step. In the first molding step, first molded part supported in a fixed mold and a second molded part supported in a die slide mold are molded in different positions in a second direction. In the sliding step, the movable mold is removed in a first direction and the first molded part and the second molded part are aligned by the die slide mold is moved in the second direction. In the second molding step, the movable mold is clamped again with the fixed mold and resin is injected into engaged portions. Each of the first molded part and the second molded part includes at least one wall extending in the first direction, and in the second molding step, the first molded part and the second molded part are engaged with each other at sides of the walls extending in the first direction.

4 Claims, 9 Drawing Sheets

(52) U.S. Cl.
CPC .......... *B29C 45/1704* (2013.01); *B29C 66/54* (2013.01); *B29C 2045/173* (2013.01)

(58) Field of Classification Search
CPC ... B29C 45/135; B29C 45/14; B29C 45/1418; B29C 45/14467; B29C 45/162; B29C 45/1635; B29C 45/164; B29C 45/1642; B29C 2045/14524; B29C 2045/1623; B29C 2045/1637; B29C 66/12; B29C 66/124; B29C 66/54; B29C 16/545; B29C 45/0062; B29C 45/1074; B29C 21/0209; B29C 21/0227; B29C 11/05; B29C 11/1886

See application file for complete search history.

(56) References Cited

U.S. PATENT DOCUMENTS

| | | | | |
|---|---|---|---|---|
| 7,147,816 | B2* | 12/2006 | Nishida | B29C 45/0062 264/255 |
| 8,388,114 | B2* | 3/2013 | Yamaguchi | B41J 2/16532 347/66 |
| 2002/0037179 | A1* | 3/2002 | Suzuki | B29C 66/124 399/111 |
| 2010/0214379 | A1* | 8/2010 | Owaki | B29C 45/162 347/85 |
| 2013/0048703 | A1* | 2/2013 | Fuchs | B65D 31/06 229/117.09 |
| 2016/0346967 | A1 | 12/2016 | Oikawa et al. | |
| 2016/0346969 | A1 | 12/2016 | Toda et al. | |
| 2016/0346976 | A1 | 12/2016 | Tsujiuchi et al. | |

FOREIGN PATENT DOCUMENTS

| | | | | |
|---|---|---|---|---|
| JP | 2002-178538 A | | 6/2002 | |
| JP | 2010173107 | * | 8/2010 | ............. B29C 45/44 |

OTHER PUBLICATIONS

Salhaney, Bob, "Best Methods of Molding Undercuts" (Nov. 28, 2012) accessed Aug. 29, 2019 (Year: 2012).*

English Translation of JP06246781A by google, retrieved Sep. 28, 2020 (Year: 2020).*

* cited by examiner

RESIN MOLDING METHOD

BACKGROUND OF THE INVENTION

Field of the Invention

The present invention relates to a resin molding method.

Description of the Related Art

In general, a flow channel configuration of a liquid ejection head having a winding hollow structure is often molded from resin in view of the ease of manufacturing, lightness, and resistance to corrosion. Japanese Patent Laid-Open No. 2002-178538 discloses a method of performing primary molding by injecting resin into different cavities in the same mold and mold the resin into parts for implementing a complicated internal structure, and then performing secondary molding by engaging the parts in the same mold and further injecting resin into the engaged portions. The above manufacturing method is hereinafter referred to as die slide injection molding. The adoption of the die slide injection molding makes it possible to manufacture molded articles having a complicated internal structure such as the above flow channel configuration with high accuracy and efficiency.

The die slide injection molding disclosed in Japanese Patent Laid-Open No. 2002-178538 is effective in forming a hollow structure by joining a box-shaped member and a lid member. However, for example, when connecting two box-shaped members having about the same size as each other, the following problem may arise.

In the case of connecting two box-shaped members, first, four slide cores are necessary for each box-shaped member to form four walls in a first molding step of forming each box-shaped member. Next, when connecting the two box-shaped members in a second molding step and extracting a finished article, it is necessary to remove the four slide cores used in the first molding step from the box-shaped members along with the opening of a main mold.

At this time, for example, if the slide cores are slid before opening the main mold, a large driving force is required to move the slide cores in four directions against the clamping force of the mold. In contrast, if the main mold is opened first, the force of opening the main mold may be exerted on each slide core, which may deform or damage the slide cores and the finished article held inside.

SUMMARY OF THE INVENTION

The present invention has been accomplished in order to solve the above problem. Accordingly, the present invention aims to provide a resin molding method for manufacturing a structure, which is obtained by connecting two box-shaped members, with high accuracy and efficiency by die slide injection molding.

According to a first aspect of the present invention, there is provided a resin molding method using a fixed mold, a movable mold movable in a first direction so as to switch between clamping of the fixed mold and the movable mold and removal of the movable mold from the fixed mold, and a die slide mold movable in a second direction different from the first direction inside the movable mold, the method comprising: a first molding step of molding a first molded part supported in the fixed mold and a second molded part supported in the die slide mold in different positions in the second direction by injecting resin into the molds while the fixed mold and the movable mold are clamped; a sliding step of aligning the first molded part and the second molded part in the second direction by removing the movable mold from the fixed mold after the first molding step and then moving the die slide mold in the second direction; a second molding step of molding a predetermined resin molded article by moving the movable mold in the first direction toward the fixed mold after the sliding step to engage the first molded part and the second molded part, and injecting resin into engaged portions while the fixed mold and the movable mold are clamped again to join the first molded part and the second molded part; and a mold opening step of removing the movable mold from the fixed mold after the second molding step, wherein each of the first molded part and the second molded part includes at least one wall extending in the first direction, and in the second molding step, the first molded part and the second molded part are engaged with each other at sides of the walls extending in the first direction.

Further features of the present invention will become apparent from the following description of exemplary embodiments with reference to the attached drawings.

DESCRIPTION OF THE EMBODIMENTS

Figure 1A:
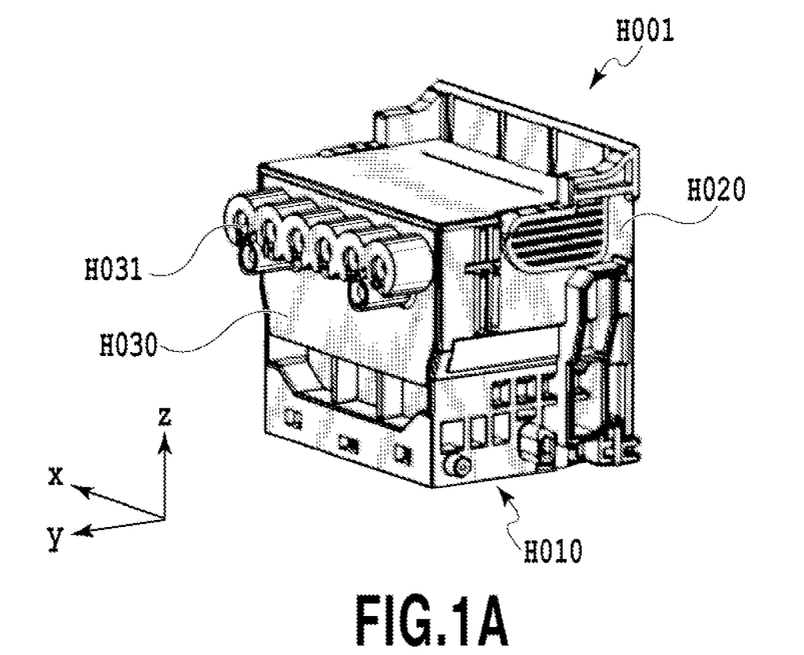
FIGS. 1A and 1B are perspective views of an inkjet head.
Figure 1B:
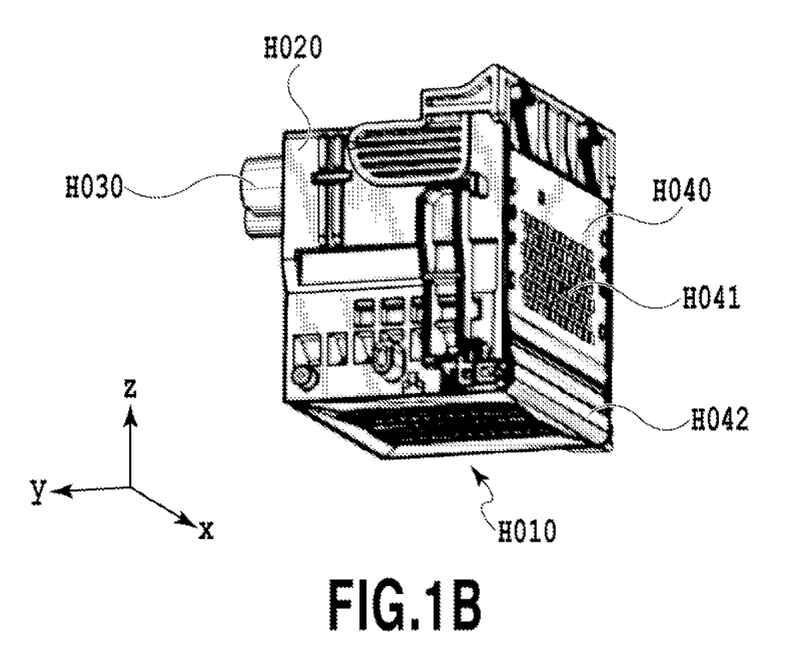

FIGS. 1A and 1B are perspective views of an inkjet head H001 (hereinafter referred to as an IJ head H001), which can be used as a liquid ejection head of the present invention, when viewed from different angles. The IJ head H001 mainly includes an ejecting element section H010, an ink storage member H020, an ink introduction member H030, and a contact substrate H040.

It is assumed that the IJ head H001 of the present embodiment is a color inkjet head for ejecting ink of six colors to print an image. Accordingly, the ink introduction member H030 is equipped with ink supply ports H031 for six colors to guide ink supplied through tubes (not shown) to the ink storage member H020.

Further, inside the ink storage member H020, ink storage chambers are independently formed for six colors to guide ink supplied from the ink supply ports H031 to the ejection element section H010. In the ejection element section H010, a plurality of ejection elements are arranged for each ink color. Each ejection element ejects ink as droplets in a −z direction in response to an ejection signal. The ejection signal is supplied from the contact substrate H040 provided on the back of the ink storage member H020 to the ejection element section H010 through a flexible printed circuit board H042.

The IJ head H001 of the present embodiment is a cartridge head that can be attached to and detached from an inkjet printing apparatus body. The contact substrate H040 is equipped with a contact pad 041 that can be electrically connected to the apparatus body when the IJ head H001 is attached to the apparatus body. The contact pad 041 is brought into contact with a contact face of the apparatus body through a flexible contact probe, thereby establishing the electrical connection. Accordingly, a high degree of flatness is required especially for an outer surface of the ink storage member H020, on which the contact pad H041 is provided, out of the four side surfaces.

Figure 2:
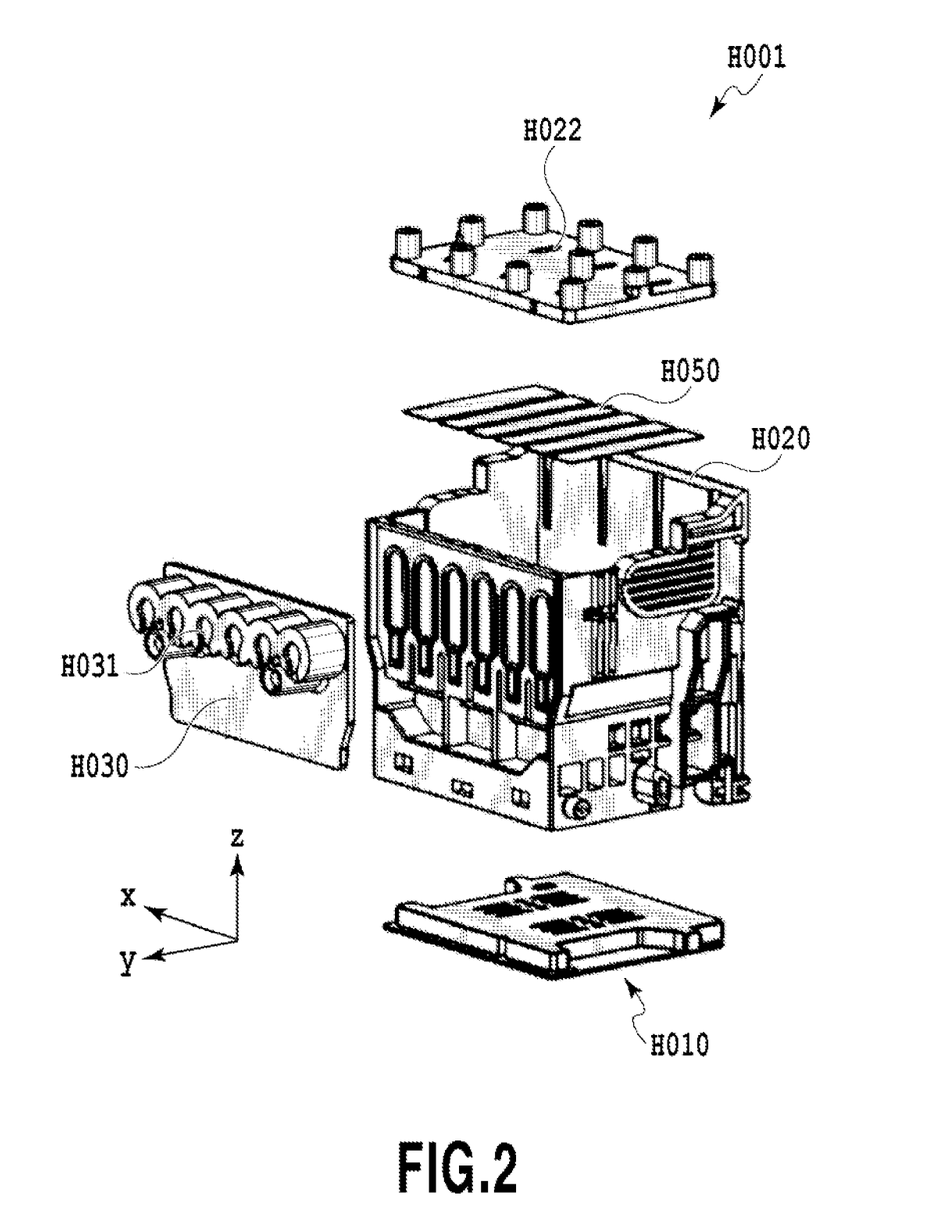
FIG. 2 is an exploded perspective view of the inkjet head.

FIG. 2 is an exploded perspective view of the IJ head H001. The box-shaped ink storage member H020 has a substantially rectangular outer shape which is about the same as the outer shape of the IJ head H001. External walls of the ink storage member H020 are equipped with a positioning structure used when attached to the apparatus body, a structure to be engaged with another component, a grid structure for receiving pressure that acts on the contact probe, and the like.

Inside the ink storage member H020, liquid chambers for guiding ink from the ink supply ports H031 to the ejection element section H010 are formed by providing a liquid chamber lid H022 from +z side in liquid channels (not shown) for guiding ink to the ejection element section H010. A filter H050 is provided in parallel to an xy-plane between the liquid chamber lid H022 and the liquid channels to prevent foreign matter and the like included in ink from reaching the ejection element section H010.

The IJ head H001 of the present embodiment is completed by attaching, to the aforementioned box-shaped ink storage member H020, the ink introduction member H030 from the +y side, the ejection element section H010 from the −z side, and the contact substrate H040 from the −y side. In the present embodiment, the ink storage member H020 is formed by die slide injection molding.

In the ink storage member H020, only the filter H050 cannot be formed by molding. Accordingly, when adopting the die slide injection molding, it is only necessary to divide the ink storage member H020 at a position into which the filter H050 will be inserted, mold each divided part in primary molding, insert the filter H050, and then join the primarily molded parts.

Figure 3:
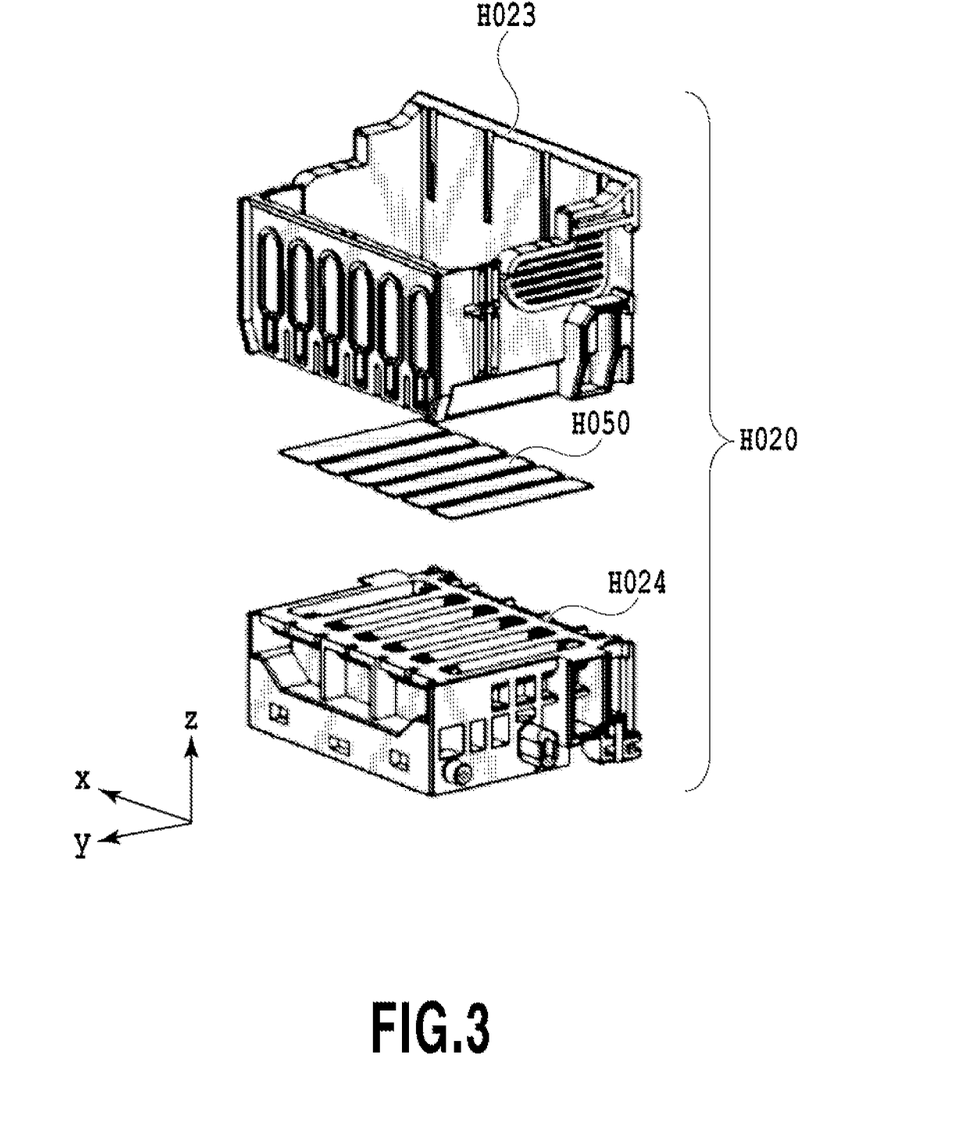
FIG. 3 is an illustration of an example of a dividing method in die slide injection molding.

FIG. 3 is an illustration of an example of the division. The liquid chamber lid H023 is formed on the +z side of the filter H050 and a liquid chamber structure H024 communicating with the ejection element section is formed on the z side of the filter H050. However, if the dividing method shown in FIG. 3 is used for primary molding in the die slide injection molding, four slide cores are necessary for each divided part. In other words, there is a need to use more slide cores, which may be damaged or deformed when opening the mold, than those used in die slide injection molding for attaching a flat lid member to a box-shaped member as disclosed in Japanese Patent Laid-Open No. 2002-178538. Therefore, a dividing method different from that shown in FIG. 3 is adopted in the present embodiment.

Figure 4:
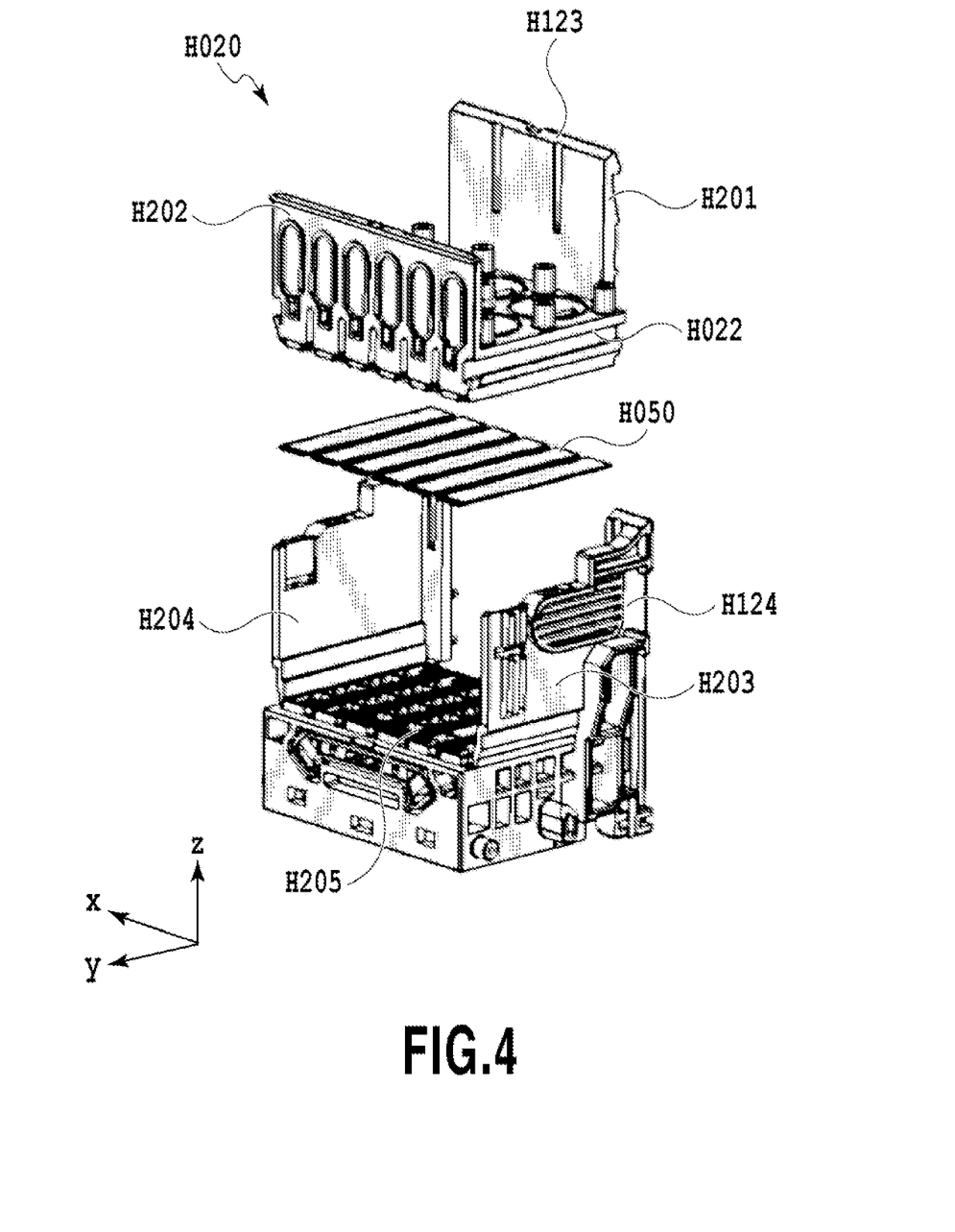
FIG. 4 is an illustration of a dividing method in die slide injection molding of the present embodiment.

FIG. 4 is an illustration of a dividing method in the die slide injection molding of the present embodiment, that is, the shapes of primarily molded parts. In the primary molding of the present embodiment, a first molded part H123 and a second molded part H124 are molded in different cavities in the mold. These molded parts are then joined in secondary molding, thereby obtaining the ink storage member H020.

The first molded part H123 includes the liquid chamber lid H022 which is parallel to the xy-plane, and a first wall H201 and a second wall H202 which are parallel to an xz-plane. The first wall H201 and the second wall H202 extend in the +z direction from both ends of the liquid chamber lid H022 in the y direction and are opposed to each other in the y direction. In contrast, no walls are provided at both ends of the liquid chamber lid H022 in the x direction.

The second molded part H124 includes a liquid chamber member H205 which has an upper surface parallel to the xy-plane, and a third wall H203 and a fourth wall H204 which are parallel to a yz-plane. The third wall H203 and the fourth wall H204 extend in the +z direction from both ends of the liquid chamber member H205 in the x direction and are opposed to each other in the x direction.

That is, in the present embodiment, each of the first molded part H123 and the second molded part H124 includes a pair of opposing walls out of the first to fourth walls H201 to H204 which are to be the four walls of the ink storage member H020. According to the above dividing method, the number of slide cores required for the primary molding, namely, the number of slide cores which may be damaged or deformed when opening the main mold, can be reduced in both the first molded part H123 and the second molded part H124 compared to the dividing method shown in FIG. 3.

When comparing the first molded part H123 with the second molded part H124, the second molded part H124, which has a complicated liquid chamber structure, is more rigid than the first molded part H123, which includes relatively large hollow space. In the actual use, the ink storage member H020 is attached to the apparatus body with the rigid second molded part H124 directed down in the direction of gravity. A surface attached to the apparatus body is equipped with a plurality of positioning datums.

Figure 5A:
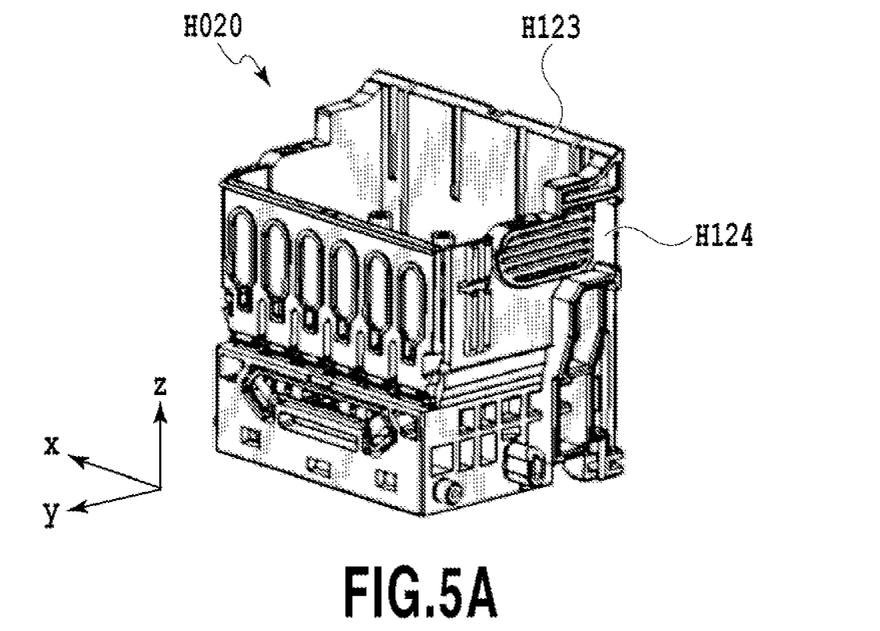
FIGS. 5A and 5B are illustrations of an article obtained in secondary molding.
Figure 5B:
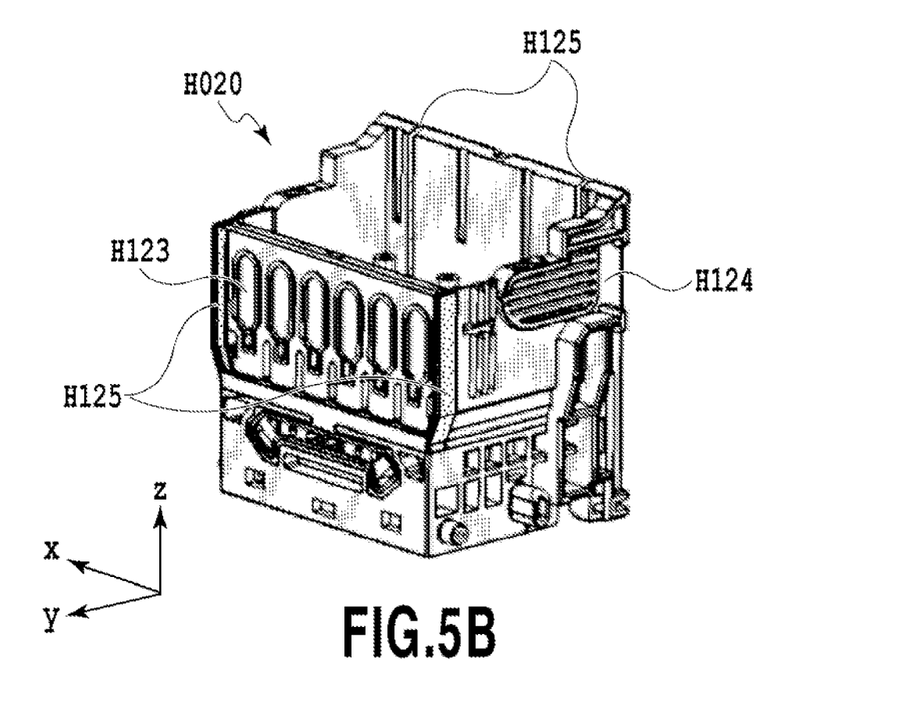

FIGS. 5A and 5B are illustrations of a secondarily molded article in the die slide injection molding of the present embodiment. FIG. 5A shows a state where the first molded part H123 and the second molded part H124 molded in the primary molding are stacked and engaged with each other. The first to fourth walls H201 to H204 are engaged with each other by stacking the first molded part H123 and the second molded part H124 in the z direction with the filter H050 interposed therebetween. As a result, a box shape is formed by the four walls.

FIG. 5B shows a state where a sealing member is further injected into the molded parts shown in FIG. 5A to join the parts. In the state where the first molded part H123 and the second molded part H124 are engaged with each other, gate runners H125 are formed at four engaged portions to guide the sealing member. When pouring the sealing member, the liquid sealing member flows along the gate runners H125 and joins the first to fourth walls H201 to H204. In the dividing method of the present embodiment, the joined portions between the first molded part H123 and the second molded part H124 are long in the z direction compared to the dividing method shown in FIG. 3. However, the sealing member can be quickly guided to all the engaged portions by providing the gate runners H125 in advance.

The die slide injection molding process of the present embodiment will be hereinafter described in detail with reference to FIGS. 6 to 9C. It should be noted that the x, y, and z axes shown in FIGS. 1A to 5B and those in FIGS. 6 to 9C are common directional axes which are fixed with respect to the ink storage member H020 and are irrelevant to the direction of gravity. In the actual use of the finished IJ head, the −z direction in FIGS. 1A to 5B corresponds to the direction of gravity. However, in the die slide injection molding process shown in FIGS. 6 to 9C, the −y direction corresponds to the direction of gravity.

Figure 6:
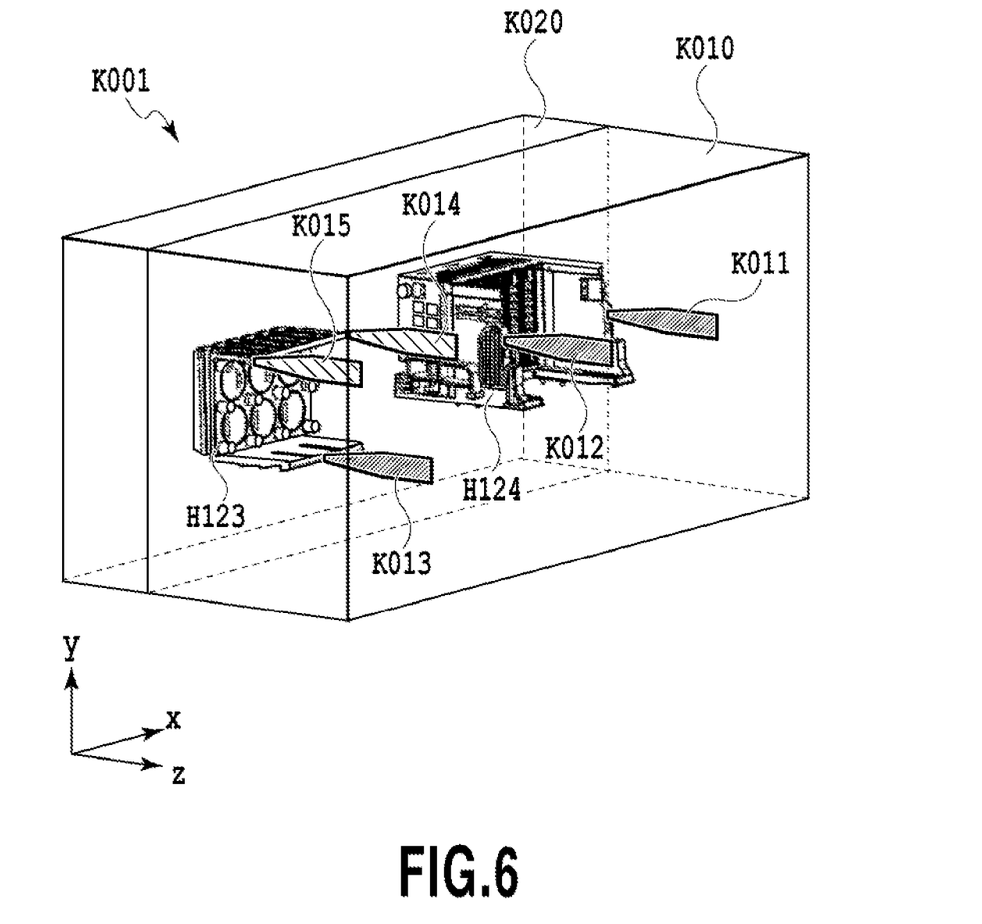
FIG. 6 is an illustration of primary molding in a main mold.

FIG. 6 is an illustration of primary molding in a main mold K001 of the present embodiment. The main mold K001 used in the present embodiment includes a fixed mold K010 and a movable mold K020 that can move away from the fixed mold K010 in the −z direction. Further, first to fifth valve gates K011 to K015 are connected to a surface of the fixed mold on the +z side. Each valve gate can inject liquefied resin into the mold at a predetermined timing.

In the primary molding, liquefied resin is injected from the first to third valve gates K011, K012, and K013 while the fixed mold K010 and the movable mold K020 are clamped as shown in FIG. 6 to mold the first molded part H123 and the second molded part H124 at a time. On the −x side of the main mold, the first molded part H123 is molded from resin injected from the third valve gate K013. On the +x side of the main mold, the second molded part H124 is molded from resin injected from the first and second valve gates K011 and K012.

Figure 7A:
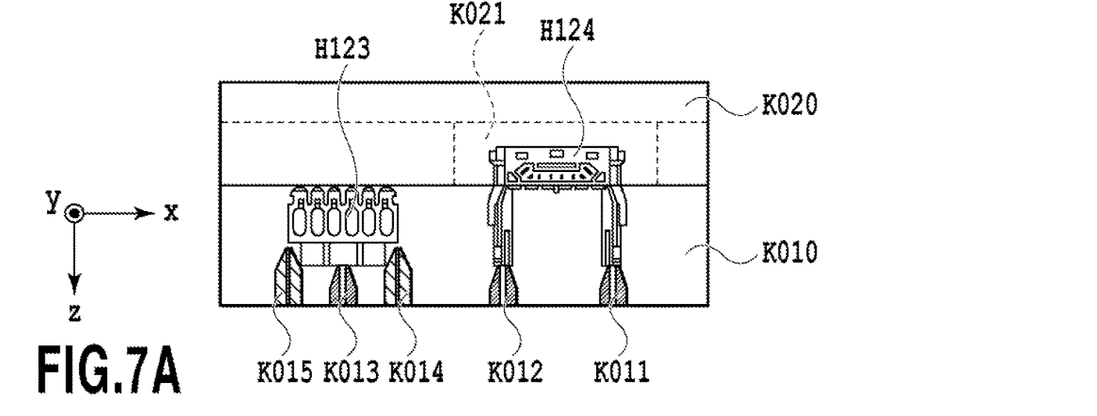
FIGS. 7A to 7D are cross-sectional views of the main mold in the primary molding.
Figure 7B:
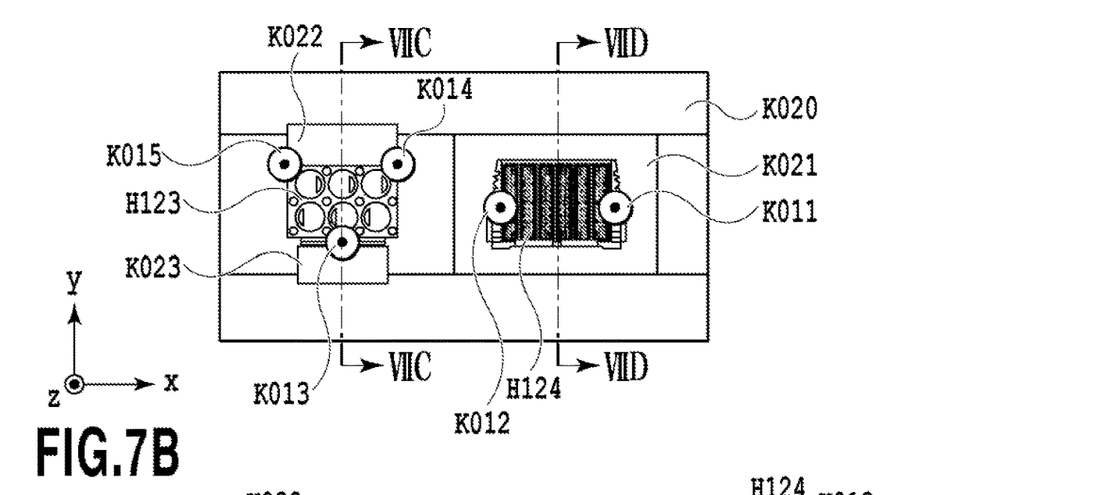
Figure 7C:
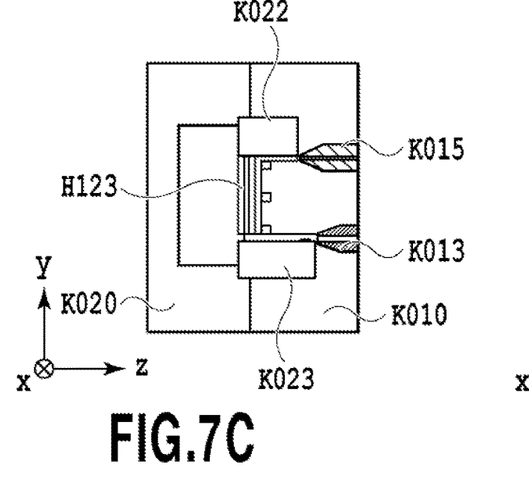
Figure 7D:
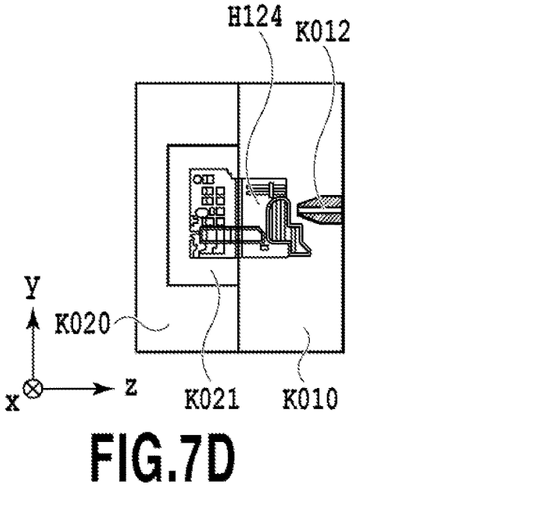

FIGS. 7A to 7D are cross-sectional views of the main mold K001 in the primary molding shown in FIG. 6. FIGS. 7A and 7B are perspective views of the main mold K001 of FIG. 6 when viewed from the +y side and the +z side. FIG. 7C is a cross-sectional view along VIIC-VIIC in FIG. 7B and FIG. 7D is a cross-sectional view along VIID-VIID in FIG. 7B.

As shown in FIG. 7A, the first molded part H123 is molded mainly on the side of the fixed mold K010. In the primary molding, in the fixed mold K010, a first slide core K022 is put to a position shown in FIGS. 7B and 7C from the +y side and a second slide core K023 is put to a position shown in FIGS. 7B and 7C from the −y side. In this state, liquefied resin is poured from the third valve gate K013. As a consequence, a bottom portion including the liquid chamber lid H022 is molded by the fixed mold K010, the first wall H201 is molded by the first slide core K022, and the second wall H202 is molded by the second slide core K023, thereby forming the first molded part H123.

With respect to the second molded part H124, as shown in FIG. 7A, the liquid chamber member H205 is molded mainly by a die slide mold K021 in the movable mold K020, and the third wall H203 and the fourth wall H204 are molded mainly by the fixed mold K010. In the primary molding, the die slide mold K021, which is movable in the −x and +x directions inside the movable mold K020, is located in a position shown in FIG. 7A. In this state, liquefied resin is poured from the first and second valve gates K011 and K012, and the second molded part H124 is thus molded in a cavity formed by the fixed mold K010 and the die slide mold K021. It should be noted that the die slide mold K021, the first slide core K022, and the second slide core K023 are actuated by a pneumatic or hydraulic cylinder.

Figure 8A:
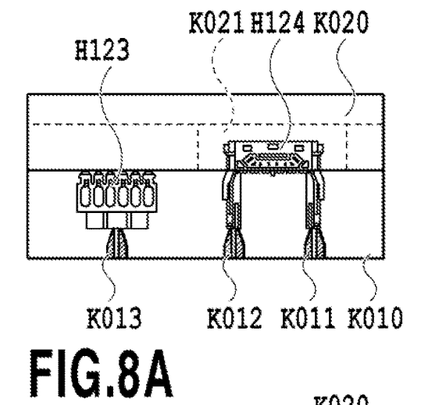
FIGS. 8A to 8F are cross-sectional views showing steps after the primary molding is finished.
Figure 8B:
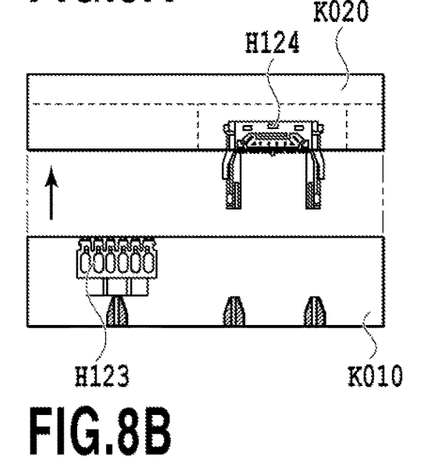

FIGS. 8A to 8F are cross-sectional views showing steps after the primary molding is finished in the die slide injection molding. FIG. 8A corresponds to FIG. 7A and shows a state of the mold immediately after the primary molding is finished. After the primary molding is finished, the movable mold K020 moves in the −z direction away from the fixed mold K010. At this time, the first molded part H123 formed mainly by the fixed mold K010 is held in the fixed mold K010, and the second molded part H124 formed mainly by the movable mold K020 is held in the movable mold K020 (FIG. 8B).

Figure 8C:
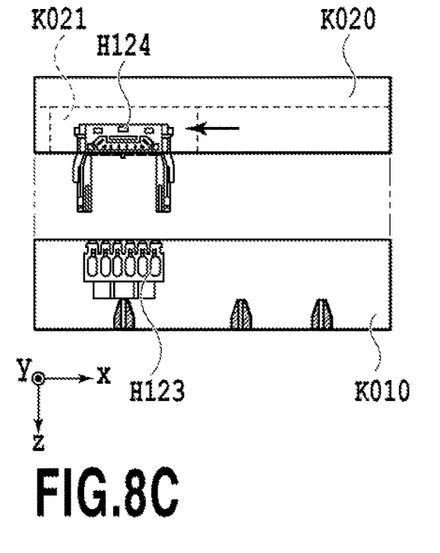
Figure 8D:
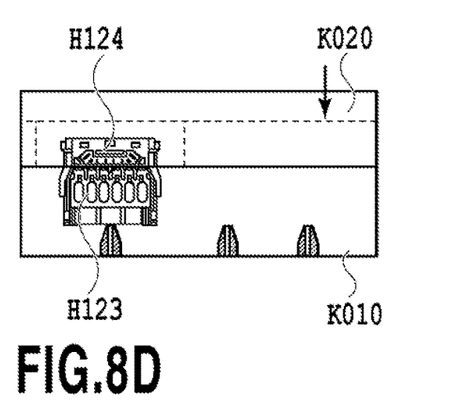

Next, inside the movable mold K020, the die slide mold K021 moves in the −x direction to align the first molded part H123 and the second molded part H124 in the x direction (FIG. 8C). Then, the prepared filter H050 is put on a surface of the liquid chamber lid H022, the movable mold K020 moves in the +z direction again, and the fixed mold K010 and the movable mold K020 are clamped (FIG. 8D). In this state, the four walls H201 to H204 of the first molded part H123 and second molded part H124 are engaged with each other as shown in FIG. 5A.

Figure 8E:
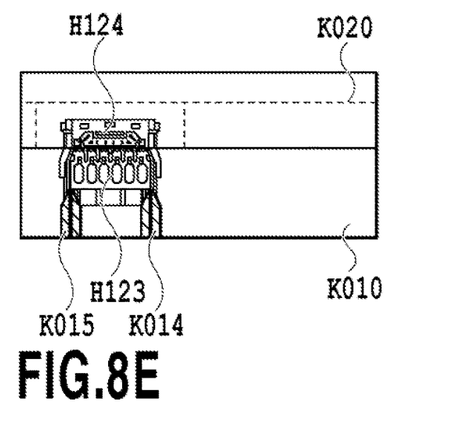

After the engagement and clamping are finished, liquefied resin is injected from the fourth valve gate K014 and the fifth valve gate K015. As described with reference to FIG. 5B, the injected resin flows along the gate runners H125 formed at the engaged positions between the first molded part H123 and the second molded part H124 to join the first to fourth walls H201 to H204 (FIG. 8E). At this time, the edge of the previously inserted filter H050 is also fixed inside the first to fourth walls H201 to H204. After that, the movable mold K020 moves in the −z direction again to open the main mold K001 (FIG. 8F), and the finished ink storage member H020 is extracted.

In the case of engaging U-shaped first and second molded parts like the present embodiment, the joined portions (sides) tend to be long in the z direction. However, if the gate runners H125 are provided in advance like the present embodiment, liquefied resin can be guided in an effective manner. As a result, there is no need to provide a further valve gate for joining.

In the case of joining U-shaped molded parts, the molded parts may be warped by cooling contraction in temporary opening of the mold. However, the first wall H201 and second wall H202 of the present embodiment are held in the slide cores K022 and K023 until secondary molding is finished. Therefore, the first wall H201 on which the contact substrate H040 will be provided can be molded with a high degree of flatness and the four walls can be joined while keeping parallelism and perpendicularity between them.

Figure 8F:
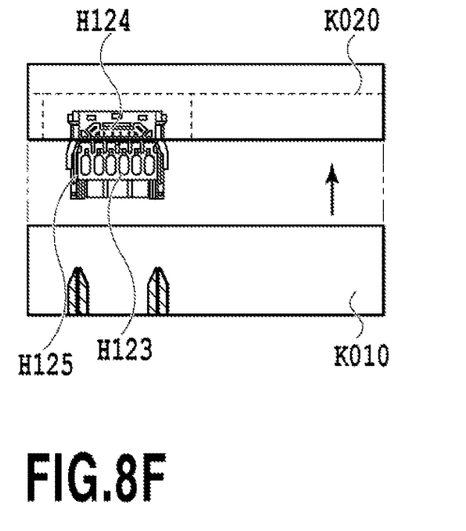

Incidentally, in the case of molding the first molded part H123 by the use of a plurality of slide cores like the present embodiment, the slide cores K022 and K023 should be moved away from the first molded part H123 along with the movement of the movable mold K020 in the removing step shown in FIG. 8F. However, in order to move the slide cores K022 and K023 while the main mold K100 is clamped, a large driving force against the clamping force is required. In contrast, if the main mold K100 is opened first, the slide cores K022 and K023 which are in close contact with the movable mold K020 while being clamped are drawn in the −z direction along with the movement of the movable mold K020. As a result, not only the slide cores K022 and K023 but also the first molded part H123 may be deformed or damaged. In order to solve this problem, the present embodiment is characterized by the order of movement of the movable mold K020 and the first and second slide cores K022 and K023 in the removing step in FIG. 8F.

Figure 9A:
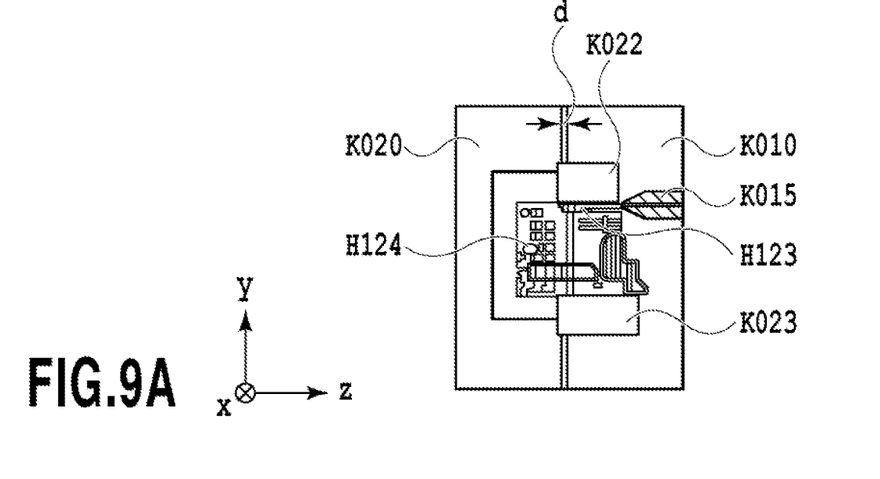
FIGS. 9A to 9C are cross-sectional views showing details of a removing step.
Figure 9B:
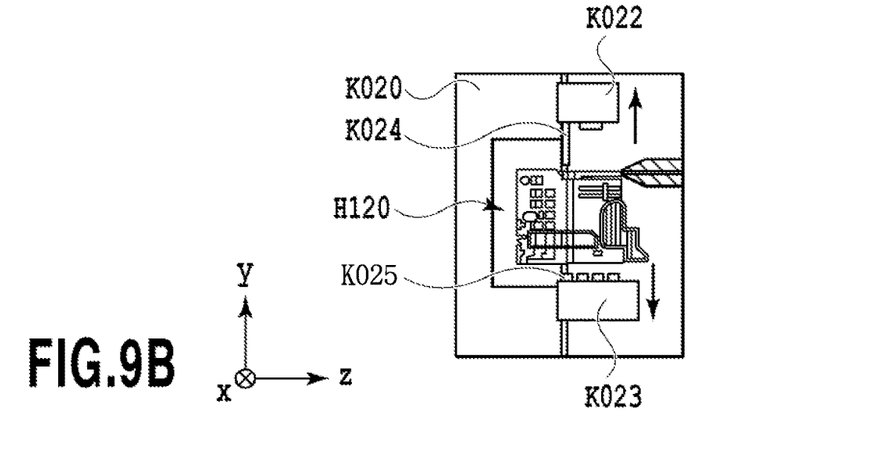
Figure 9C:
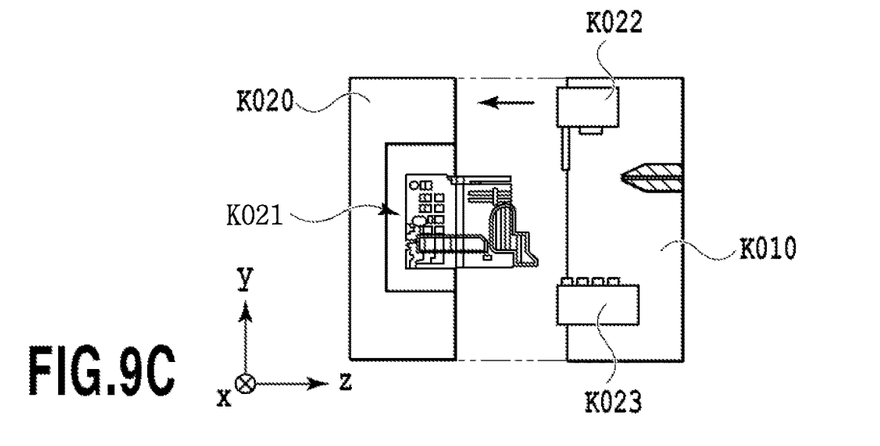

FIGS. 9A to 9C are cross-sectional views showing details of the removing step shown in FIGS. 8E and 8F. FIGS. 9A to 9C are cross-sectional views of the main mold K100 when viewed from the −x side. In the present embodiment, after the first molded part H123 and the second molded part H124 are joined as shown in FIG. 8E, the movable mold K020 slightly moves in the −z direction (first movement). FIG. 9A shows a state after the finish of the first movement, where a small gap d is made between the movable mold K020 and the fixed mold K010.

Since the main mold K100 is unclamped by the first movement, a load imposed on the slide cores K022 and K023 is reduced, which facilitates the movement of the slide cores K022 and K023 in the −y and +y directions. That is, the slide cores K022 and K023 can be removed from the first molded part H123 without generating an excessively large driving force. FIG. 9B shows a state where the slide cores K022 and K023 are removed from the first molded part H123 (second movement).

As shown in the drawings, the first slide core K022 and the second slide core K023 are equipped with projections K024 and K025, respectively. The projections K024 and K025 are inserted into the first molded part H123 to support it. The projections K024 and K025 are the most prone to be drawn toward the movable mold K020 and deformed when moving the movable mold K020. Thus, in the present embodiment, a distance d of the first movement of the movable mold K020 is set so as to reliably unclamp the main mold K100 without deforming the projections K024 and K025.

After the second movement is finished, the movable mold K020 further moves in the −z direction (third movement). At this time, since the first slide core K022 and the second slide core K023 are already removed from the first molded part H123, the slide cores K022 and K023 and the first molded part H123 are not affected by the movement of the movable mold K020. Although not shown in the drawings, slide cores are also provided for forming peripheral walls of the second molded part H124 in the first molding. However, these slide cores are not removed from the second molded part H124 during the first to third movements. As a result, the movable mold K020 smoothly moves in the −z direction in the third movement, and the main mold K100 is opened while the liquid storage member H020 is held on the die slide mold K021 side (FIG. 9C). Then, the slide cores in the die slide mold K021 are removed from the second molded part H124, which allows a user to extract a finished article, or the liquid storage member H020.

As describe above, in the present embodiment, two opposing walls out of first to fourth walls, which are to be external walls of a finished article, are molded in the fixed mold K010 as part of the first molded part, and the remaining two walls are molded in the movable mold K020 as part of the second molded part in primary molding. After the molded parts are joined in secondary molding, the main mold K001 is opened in three stages, namely, the first movement of the movable mold K020, the second movement of the slide cores K022 and K023, and the third movement of the movable mold K020. As described above, according to the present embodiment, the shapes of the first and second molded parts are devised such that a load is imposed on less components when opening the mold. Further, the load imposed on the components is reduced by alternately moving the movable mold and the slide cores in stages when actually opening the mold. As a result, die slide injection molding can be implemented with high yields and the lifetime of the mold can be extended.

In the above embodiment, the substantially rectangular ink storage member H020 is described as an example of a finished article of die slide injection molding. However, the finished article is not limited to this. For example, an embodiment of molding three surfaces as part of a first molded part and three surfaces as part of a second molded part in primary molding and then joining the parts in secondary molding may be adopted. Further, as a matter of course, a resin molded article as a finished article is not limited to an ink storage member for an inkjet head. The present invention is effective as long as several surfaces are separately molded by using a fixed mold and a movable mold in primary molding and the surfaces are joined at their sides in secondary molding when molding resin into an article having several surfaces by die slide injection molding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-127560, filed Jun. 28, 2016, which is hereby incorporated by reference wherein in its entirety.

What is claimed is:

1. A resin molding method using a fixed mold, a movable mold movable in a first direction so as to switch between clamping of the fixed mold and the movable mold and removal of the movable mold from the fixed mold, and a die slide mold movable in a second direction different from the first direction inside the movable mold, the method comprising:
   a first molding step of molding a first molded part supported in the fixed mold and a second molded part supported in the die slide mold in different positions in the second direction by injecting resin into the molds while the fixed mold and the movable mold are clamped;
   a sliding step of aligning the first molded part and the second molded part in the second direction by removing the movable mold from the fixed mold after the first molding step and then moving the die slide mold in the second direction;
   a second molding step of molding a predetermined resin molded article by moving the movable mold in the first direction toward the fixed mold after the sliding step to engage the first molded part and the second molded part, and injecting resin into engaged portions while the fixed mold and the movable mold are clamped again to join the first molded part and the second molded part; and
   a mold opening step of removing the movable mold from the fixed mold after the second molding step,
   wherein each of the first molded part and the second molded part includes a bottom surface and a pair of opposing walls that extend from the bottom surface in the first direction and are opposed to each other,
   wherein, before the second molding step, the method further comprises a step of interposing a filter between the bottom surface of the first molded part and the bottom surface of the second molded part and
   wherein, in the second molding step:
   the pair of opposing walls of the first molded part and the pair of opposing walls of the second molded part are located alternately adjacent to each other to form a frame body; and
   the filter is fixed between the bottom surface of the first molded part and the bottom surface of the second molded part.

2. The resin molding method according to claim 1, wherein a slide core movable in a third direction different from the first and second directions for molding the first molded part is provided inside the fixed mold, and
   wherein the mold opening step includes a first movement of moving the movable mold away from the fixed mold in the first direction by a predetermined distance, a second movement of moving the slide core in the third direction to remove the slide core from the first molded part after the first movement, and a third movement of further moving the movable mold away from the fixed mold after the second movement.

3. The resin molding method according to claim 2, wherein the predetermined resin molded article is an ink storage member equipped with a liquid chamber for guiding ink to an ejection element section of an inkjet head,
- wherein the inkjet head is manufactured by attaching the ejection element section, an ink introduction member for guiding ink to the ink storage member, and a contact substrate for supplying the ejection element section with a signal for ejecting ink, to the ink storage member, and
- wherein the contact substrate is provided on a wall of the first molded part molded in the slide core.

4. The resin molding method according to claim 3, wherein the second molded part is equipped with a positioning member used for attaching the inkjet head to an inkjet printing apparatus.

* * * * *